UNITED STATES PATENT OFFICE.

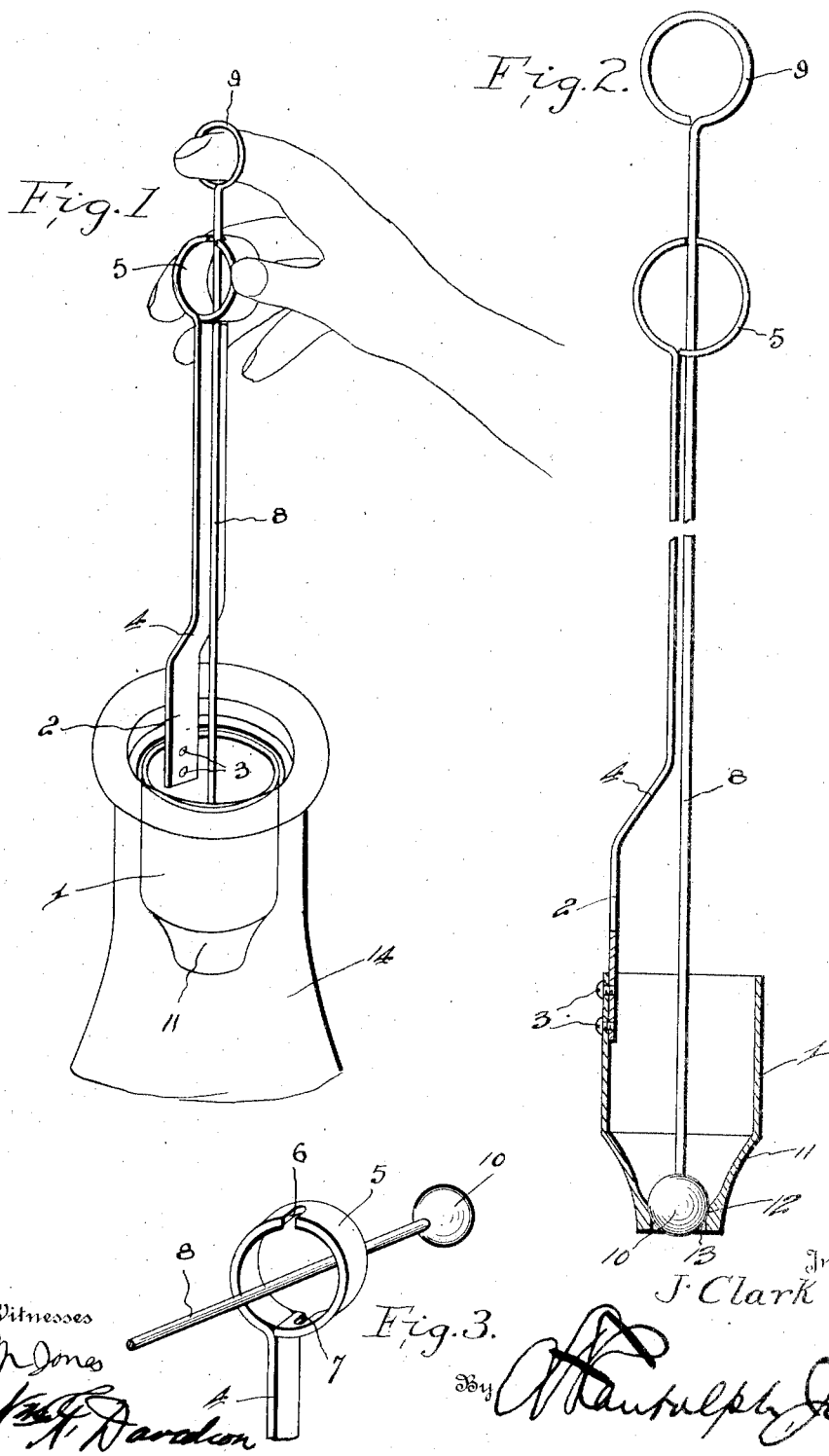

JERRIE CLARK, OF SPRINGFIELD, MASSACHUSETTS.

CREAM-SEPARATOR.

1,341,261.  Specification of Letters Patent.  Patented May 25, 1920.

Application filed August 29, 1919. Serial No. 320,687.

*To all whom it may concern:*

Be it known that I, JERRIE CLARK, a citizen of the United States, residing at Springfield, in the county of Hampden and State of Massachusetts, have invented certain new and useful Improvements in Cream-Separators; and I do hereby declare the following to be a full, clear, and exact description of the invention, such as will enable others skilled in the art to which it appertains to make and use the same.

This invention relates to improvements in cream separators and more particularly to a device capable of being lowered within the neck of a milk bottle, containing milk which has cream accumulated thereon, to allow the cream to enter within a receptacle and after the entire accumulation of cream has passed into the receptacle or the receptacle has become filled, a valve may be closed and the cream within the receptacle may then be emptied into a pitcher or other container, without the danger of milk entering or mixing with the cream.

An object of this invention is to provide a receptacle, having a valve seat formed in the lower end, to be lowered within the neck of the milk bottle by a handle, which carries a valve to engage the valve seat and close an intake port after the receptacle has become filled with cream and a portion of the accumulation of cream has been removed or separated from the milk within the milk bottle.

Another and more specific object of this invention is to provide the handle with a ring or loop, having oppositely disposed slots to receive a valve rod, whereby the device may be operated by one hand of the operator.

A still further object of this invention is the provision of a cream separator of the above stated character, which shall be simple, durable, efficient and which can be manufactured and sold at a comparatively low cost.

With these and other objects in view as will become more apparent as the description proceeds, the invention consists of certain novel features of construction, combination and arrangement of parts as will be hereinafter more fully described and claimed.

For a complete understanding of my invention, reference is to be had to the following description and accompanying drawing, in which:—

Figure 1 is a perspective view of a cream separator inserted within the neck of a milk bottle, constructed in accordance with my invention, Fig. 2 is a side elevation partly in section, illustrating the valve in a seated or closed position, and Fig. 3 is a detail perspective view of a portion of the handle and valve rod.

Referring in detail to the drawing, the numeral 1 indicates a receptacle having a handle 2 secured to the side thereof by means of screws 3. The handle 2 is off-set upwardly and inwardly as illustrated at 4 to bring the remaining portion of the handle 2 into vertical alinement with the central portion of the receptacle 1. The free end of the handle 2 is bent to form a loop 5 or finger grip and is provided with oppositely disposed slots 6 and 7, the inner walls of each being in vertical alinement with each other.

A valve rod 8 is provided with a finger loop 9 at one end thereof and is of greater length than the handle 2, extending from a point above the loop 5 of the handle 2, to a point adjacent the lower end of the receptacle 1. The valve rod 8 extends through the oppositely disposed slots 6 and 7 and has secured to the lower end thereof, a ball or sphere 10.

The receptacle 1 has its lower walls contracted as illustrated at 11 to form a valve seat 12 and an intake port 13. The ball or sphere 10 is adapted to rest upon the valve seat 12 and close the intake port 13 when desired, for controlling the inflow and outflow of cream to the receptacle 1.

In operation the first step taken by the operator is to grip the loop 5 of the handle 2, between the thumb and middle finger and place the index finger through the finger loop 9 as illustrated in Fig. 1. In this position the ball or sphere 10 is away from an engagement with the valve seat 12 and the receptacle 1 is then gently lowered within the neck of the bottle 14 and through the accumulation of cream upon the milk until a point adjacent the surface of the milk is reached. The cream is then allowed to accumulate or run into the receptacle 1 by way of the intake port 13, until the receptacle 1 is filled. The index finger is then moved downwardly in the direction of the middle finger and thumb, until the ball or sphere 10 is seated upon the valve seat 12. The device then may be conveyed to a pitcher or container and by raising the index finger the port 13 will be again opened and the cream within the receptacle 1 may then drain or run into the pitcher or container.

The next step in removing the cream remaining upon the milk is to lower the receptacle 1 into the neck of the bottle with the ball or sphere 10 into an engagement with the valve seat 12, which will cause the milk and cream to rise in the bottle. The cream will then overflow the top edge of the receptacle 1, whereby all of the remaining cream may be collected within the receptacle 1 off the milk.

The valve rod 8 may be detached from the handle 2 by swinging said valve rod to a horizontal position as illustrated in Fig. 3 and withdrawing it from the loop 5 for cleansing and other purposes.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A cream separator comprising a receptacle having both ends open, a handle detachably secured to the receptacle for lowering said receptacle within the neck of a milk bottle, said handle off-set upwardly and inwardly intermediate its end to bring the remaining portion of the handle into vertical alinement with the center of said receptacle, said handle provided with its free end bent to form a finger grip, said finger grip provided with slots therein, said receptacle provided with its lower wall contracted to form a valve seat, a valve rod slidable through the slots of said finger grip, a ball secured to one end of the valve rod to coöperate with the valve seat to close the lower end of said receptacle to control the inflow and outflow of cream to and from the receptacle.

2. A cream separator comprising a receptacle, a valve for closing said receptacle, a handle secured to the receptacle, a finger grip formed on said handle and having oppositely disposed slots and said slots positioned one above the other with their inner ends in overlapping relation, and a valve rod formed on the valve and received by the slots.

In testimony whereof I affix my signature in presence of two witnesses.

JERRIE CLARK.

Witnesses:
C. T. NEAL,
DORIS A. THOMPSON.